United States Patent
Humphries

(10) Patent No.: US 8,186,934 B2
(45) Date of Patent: May 29, 2012

(54) CASING ASSEMBLY

(75) Inventor: Neil Humphries, Derby (GB)

(73) Assignee: Rolls-Royce PLC (GB)

( * ) Notice: Subject to any disclaimer, the term of this patent is extended or adjusted under 35 U.S.C. 154(b) by 1128 days.

(21) Appl. No.: 12/036,579

(22) Filed: Feb. 25, 2008

(65) Prior Publication Data

US 2008/0226444 A1    Sep. 18, 2008

(30) Foreign Application Priority Data

Mar. 14, 2007  (GB) .................................. 0704879.6

(51) Int. Cl.
*F01B 25/16*  (2006.01)

(52) U.S. Cl. .......... 415/9; 415/126; 415/213.1; 415/196

(58) Field of Classification Search .............. 415/9, 196, 415/126, 129, 213.1, 214.1, 215.1, 220; 403/256, 403/259, 254
See application file for complete search history.

(56) References Cited

U.S. PATENT DOCUMENTS

| | | |
|---|---|---|
| 4,149,824 A | 4/1979 | Adamson |
| 4,934,899 A | 6/1990 | Patacca |
| 5,188,505 A | 2/1993 | Schilling et al. |
| 5,205,708 A * | 4/1993 | Plemmons et al. ........ 415/173.1 |
| 5,267,828 A * | 12/1993 | Lenhart et al. .................... 415/9 |
| 5,431,532 A | 7/1995 | Humke et al. |
| 5,482,429 A | 1/1996 | Penda |
| 6,149,380 A | 11/2000 | Kuzniar et al. |
| 6,179,551 B1 | 1/2001 | Sathianathan et al. |
| 6,200,091 B1 * | 3/2001 | Bromann et al. .......... 415/173.1 |
| 6,227,794 B1 | 5/2001 | Wojtyczka et al. |
| 6,508,623 B1 * | 1/2003 | Shiozaki et al. ........... 415/173.1 |
| 6,619,913 B2 | 9/2003 | Czachor et al. |
| 6,637,186 B1 | 10/2003 | Van Duyn |
| 2004/0037694 A1 | 2/2004 | Mather |
| 2005/0196270 A1 * | 9/2005 | Amiot et al. ............... 415/170.1 |
| 2005/0246889 A1 * | 11/2005 | Charrier et al. .................. 29/700 |

FOREIGN PATENT DOCUMENTS

| | | |
|---|---|---|
| EP | 0626502 A1 | 11/1994 |
| EP | 1084951 A3 | 10/2001 |
| EP | 1336739 A3 | 3/2005 |
| GB | 2288639 A | 10/1995 |
| GB | 2365926 A | 2/2002 |
| GB | 2407344 A | 4/2005 |
| GB | 2416192 A | 1/2006 |
| GB | 2422407 A1 | 7/2006 |
| GB | 2426287 A | 11/2006 |

* cited by examiner

*Primary Examiner* — Edward Look
*Assistant Examiner* — Adam W Brown
(74) *Attorney, Agent, or Firm* — McCormick, Paulding & Huber LLP

(57) ABSTRACT

Provision of panels within casings can cause problems where retaining bolts require apertures in the casings, which in turn may reduce the structural strength of that casing. By providing a ring within the casing and appropriate retainer elements secured to that ring, which elements in turn appropriately present panels, it is possible to provide a casing assembly which avoids the necessity of drilling or otherwise forming holes in the casing. Dam elements can be provided at each end of the assembly to prevent axial movement and therefore retain panel position within the casing.

11 Claims, 4 Drawing Sheets

CASING ASSEMBLY

CROSS REFERENCE TO RELATED APPLICATION

This application is entitled to the benefit of British Patent Application No. GB 0704879.6 filed on Mar. 14, 2007.

BACKGROUND OF THE INVENTION

The present invention relates to casing assemblies and more particularly to retaining liner-casing panels in a gas turbine engine.

DESCRIPTION OF RELATED ART

Turbofan gas turbine engines for powering aircraft conventionally comprise an engine core, which drives a fan. The fan comprises a number of radially extending fan blades mounted on a fan rotor, enclosed by a generally cylindrical or frustoconical fan casing. The engine core comprises one or more turbines, each one of which comprises a number of radially extending turbine blades, enclosed by a generally cylindrical or frustoconical casing.

There is a remote possibility with such engines that part or all of a fan blade or a turbine blade could become detached from the remainder of the fan or turbine. In the case of a fan blade becoming detached, this may occur as a result of, for example, the turbofan gas turbine engine ingesting a bird or other foreign object.

The use of containment rings for turbofan gas turbine engine casings is well known. It is known to provide generally cylindrical or frustoconical, relatively thick, metallic containment rings. It is also known to provide generally cylindrical or frustoconical, locally thickened, isogrid metal containment rings. Furthermore, it is known to provide strong fibrous material wound around relatively thin metallic casings to extend from containment casings. In the event that a blade becomes detached to prevent parts through the casing, those parts are contained by the fibrous material in the panel or panels.

There is a requirement to provide a fan case liner within the fan casing. Conventionally, the fan case liner is attached within the fan casing by mechanical fasteners passing through the liner and secured into or through the fan casing, or by adhesive.

Conventional mechanical attachment of fan case liners uses fasteners extending radially through reinforced regions of the liner panel. These fasteners produce steps and gaps, which interfere with the aerodynamic flow over the liner panel. The presence of the reinforced regions increases the weight and cost of the liner panels. Furthermore, the fasteners must be secured into or through the fan casing, which weakens the casing and may interfere with its ability to contain a detached fan blade.

Adhesive bonding of the fan case liner to the fan casing must be performed under controlled conditions. If a liner has to be replaced in service, it may be difficult to control the bonding conditions and this can result in unsatisfactory attachment of the replacement liner to the casing. It can be difficult to remove a damaged liner without also damaging the fan casing. The design of fan casings has to include an allowance for possible weakening caused by such damage. This increases the cost and weight of the fan casing.

In view of the above, it will be appreciated that both conventional mechanical fixings extending through the casing and adhesive bonding are generally unsatisfactory.

SUMMARY OF THE INVENTION

In accordance with aspects of the present invention, there is provided a casing assembly including a ring placed within a casing in use and the ring associated with a retainer for a panel, the retainer configured to appropriately present the panel relative to a casing about which the ring is placed without a direct mechanical fixing between the panel and the casing, and location reformed by the assembly of the ring, the retainer and the panel.

Generally, the ring is sized to provide a snug fit within the casing. Possibly, the ring has an interference fit within the casing. Alternatively, the ring may be able to fit within the casing or outside of the casing.

Generally, the ring is segmented.

The retainer may incorporate a rail to receive an end of the panel. The retainer may be a compression moulding. Possibly, the retainer is integrally formed with the panel. Possibly, the retainer is formed from steel or a glass composite material.

Possibly, the panel has an integral rib reinforcement structure.

Possibly, the retainer is secured to the ring by a captive bolt.

Generally, the casing assembly of the present invention includes a plurality of panels associated with the ring in use.

Possibly, the casing assembly incorporates a dam feature to retain location of the ring within the casing in use. Possibly, dam features are provided at both ends of the assembly.

Possibly, the ring is additionally adhesive bonded. Possibly, the assembly includes an adjustment clip. Possibly, the adjustment clip includes a tab for location relative to the ring.

Possibly, the retainer is a U section ring and the ring clamps against the U section ring to cause distortion in use to retain the U section ring against the casing.

Also in accordance with aspects of the present invention there is provided a gas turbine engine including a casing assembly having a ring placed within a casing in use and the ring associated with a retainer for a panel, the retainer configured to appropriately present the panel relative to a casing about which the ring is placed without a direct mechanical fixing between the ring and the casing and location retained by the assembly of the ring, the retainer and the panel.

DETAILED DESCRIPTION OF THE PREFERRED EMBODIMENTS

As indicated above, introducing apertures, which can provide sites of weakness within a casing, should be avoided. The obvious alternative of utilising an adhesive bonding mechanism in itself has problems if repairs are required. Aspects of the present invention utilise location of a generally loose fit or interference fit ring placed within the casing which acts as an anchor upon which a retainer for presenting a panel is configured such that the panel can then be presented adjacent to the casing or as otherwise required. In such circumstances, the ring is not secured to the casing and therefore does not introduce areas of weakness whilst the panel itself along with a retainer are also mechanically separate from the casing. However, it will be appreciated that the ring may be secured to the casing at an appropriate location where stressing may not be a problem and as the ring will only require mechanical fixings at that position. However, aspects of the present invention provide a loose ring, which, in view of the configuration of the casing and/or provision of dam elements as described later, ensures that the panels are appropriately located within a casing as required. In such circumstances in gas turbine engine fan casings, which have areas where it is not possible for stress reasons to drill holes, it is possible with an assembly in accordance with aspects of the present invention, to present panels. It will be appreciated these panels may be for acoustic noise reduction effects or to act as flow path smoothing surfaces or for debris containment reasons.

Figure 1:
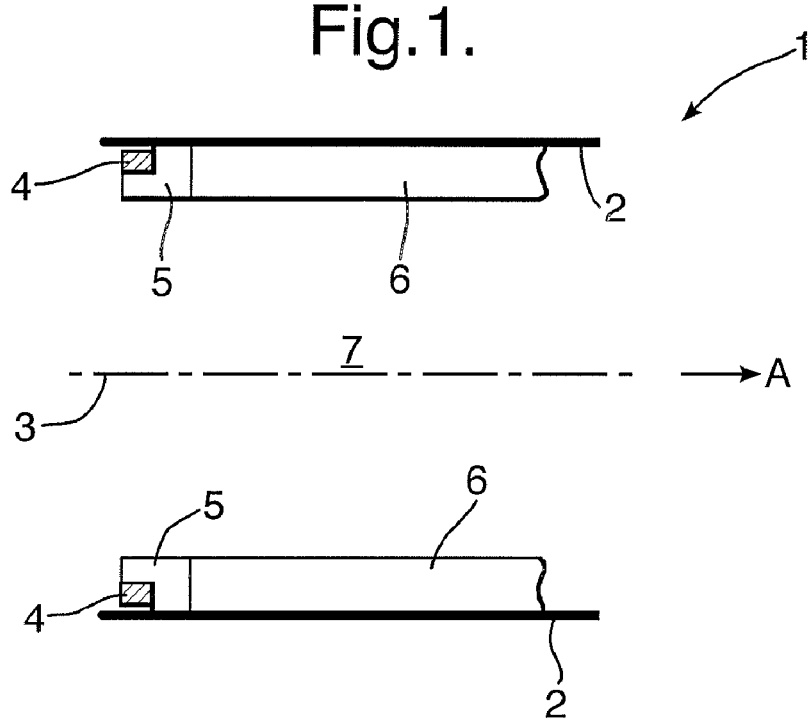
FIG. 1 is a schematic cross section of a first embodiment of a casing assembly in accordance with one aspect of the present invention.

FIG. 1 provides a schematic cross section of a casing assembly 1 in accordance with aspects of the present invention. The assembly 1 comprises a casing 2, which is generally an annulus about a centre line 3. Within the casing 2, a ring 4 is located and placed at one end, which has a loose or snug or an interference fit within the casing 2. Generally, the ring 4 is of a segmented nature to allow assembly within the casing 2 with appropriate cross segment retainers to define the ring upon installation. The ring 4 is also associated with retainer elements 5 in order to present a panel or panels 6 appropriately adjacent to the casing 2. The panels 6 as indicated previously may be for acoustic noise or for other reasons. As will be described later, the retainers 5 are robustly secured to the ring 4, but overall, the assembly has no mechanical connection between the casing 2 and the ring 4, the retainers 5 and the panels 6.

The retainers 5 generally incorporate a rail or other facility to engage and present the panel 6 in use. The retainers 5 may subtend the whole arc of the ring 5 or parts of segments as required provided sufficiently robust presentation of the panels 6 is achieved.

It will be appreciated in use the casing 2 along with the ring 4, retainers 5 and panels 6 are substantially stable whilst rotary parts of an engine are located within a core 7. Generally, the rotating parts rotate about the centre line 3 in order to generate thrust or provide power in a prime mover assembly. In such circumstances by appropriate location of the ring 4 it will be appreciated that an anchor is provided upon which the retainer elements 5 can then present the panel 6 in use. By provision of such an anchor the panels 6 are located and so will not move laterally within the casing 2 when assembled. It will be appreciated that some casings 2 are of a conical tapering configuration in the direction of thrust (schematically shown as A in FIG. 3) and therefore the panel 6 along with ring 4 and retainers 5 will be squeezed into the taper of that conical and therefore location maintained when assembled. As will be described later provision of a dam element in the casing or through use of wedges or other elements, it will be possible to prevent such movement in any event in the opposite direction to tapering.

As indicated, the retainer ring 4 is generally produced in segments which are attached together using over spanning joint straps. Generally, these joint straps will be fastened to outer (convex) surfaces of the ring 4 and possibly counter sunk.

It will be understood that the ring will generally be formed from an appropriate material such as steel or carbon or a glass composite, which has sufficient mechanical strength to allow anchoring of the retainers 5.

Figure 2:
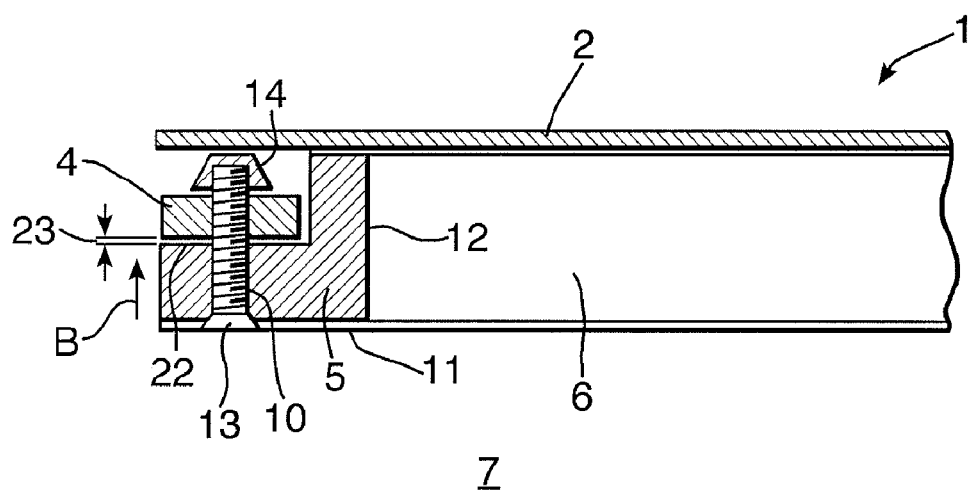
FIG. 2 is a schematic illustration of a ring, a retainer and a panel adjacent a casing in accordance with aspects of the present invention.

Generally, the retainers 5 will be secured to the ring through a captive bolt assembly as depicted in FIG. 2. Thus, as can be seen, the ring 4 is again located within the casing 2 with a bolt 10 extending from an inner surface 11 outwardly to retain association between the retainer 5 and the ring 4. The bolt 10 has a nut 14 to capture the association between the ring 4 and the retainer 5. A head 13 of the bolt 10 is generally shaped and countersunk to provide a consistent flat surface with the inner surface 11 of the assembly 1. The ring 4 will generally incorporate cut out segments within which the nuts 14 can be located and secured using an appropriate tool. In such circumstances the association between the ring 4 and the retainer 5 is robust. With a robust association between the ring 4 and the retainer 5, it will be understood that the panels 6, which themselves are relatively rigid, are appropriately presented to the casing 2.

The retainer 5 will normally incorporate appropriate rail segments to interlock the panel 6 with the retainer 5. It will also be understood that the retainer 5 may be integrally formed with the panels 6 to ensure appropriate presentation. The retainer 5 essentially presents the panel 6 within the casing 2. Thus, the relationship and interaction at an interface 12 is important with regard to achieving an appropriate presentation in use. The retainer 5 will be substantially rigid and the panel 6 will generally be a conventional honeycomb structure with composite or metal skins on both sides incorporating the retainer 5. Alternatively, the panel 6 could be an injection moulding. The panel 6 may incorporate an integral reinforcement rib or other structure to again ensure that this panel 6 is stiff and remains in the desired shape for association adjacent to the casing 2. This shape will normally be curved so that the panel is flat to the casing 2.

Further to ensure appropriate assembly generally the ring 4, in terms of its segments, and the panel 6 will have circumferential lengths so that when assembled respective panels 6 will bridge joint strap positions between ring 5 segments. Such configuration will further strengthen the assembly in use.

In view of the above, it will be understood that the ring 4 is so dimensioned that the retainer 5 held by the bolt 10 can be screwed in the direction of arrowhead B into the ring such that the retainer 5 is closely associated with the ring 4 which in turn will configure the panels 6 so that they are pushed against the casing 2. When assembled the combined ring 4 and retainer 5 give a high degree of rigidity and impact resistance to the assembly 1.

It will be understood that casings can take a number of forms as indicated above including a conical or tapering casing which narrows from a generally forward broader opening end to a narrower exit end. In such circumstances a casing assembly in accordance with aspects of the present invention with a loose retainer ring will be arranged such that the panels of the assembly will remain in place in view of the nature of flow being towards the narrower construction. However, to prevent vibration or "bounce back" movement following removal of the flow pressure, a dam assembly can be provided upstream of the ring to dampen and prevent lateral axis travel within the casing. Similarly, with a parallel casing, that is to say a generally consistent cylindrical casing dam elements can be provided at both ends to prevent movement of the ring. It will be appreciated an alternative is to provide one retaining ring at one end of the assembly which is secured to the casing through bolts. In such circumstances the engine and therefore casing configuration can be determined such that apertures through the casing to accommodate the retaining bolts will be at positions where stressing and reduction in the mechanical strength of the casing is less important.

The embodiment of the present invention depicted in FIG. 2 may be modified and varied by specifying that the diameter of the retaining ring 4 is greater than a location face 22 of the rail 5. Thus, there is a gap 23 between the ring 4 and face 22. In such circumstances if the present assembly is assembled outside of the casing 2 then the ring can be slightly larger than a location face 22. However, by tightening the bolts 10 this may cause a slight local distortion of the ring 4 enabling the panel 6 to be pressed into contact with casing bore 2.

Figure 3A:
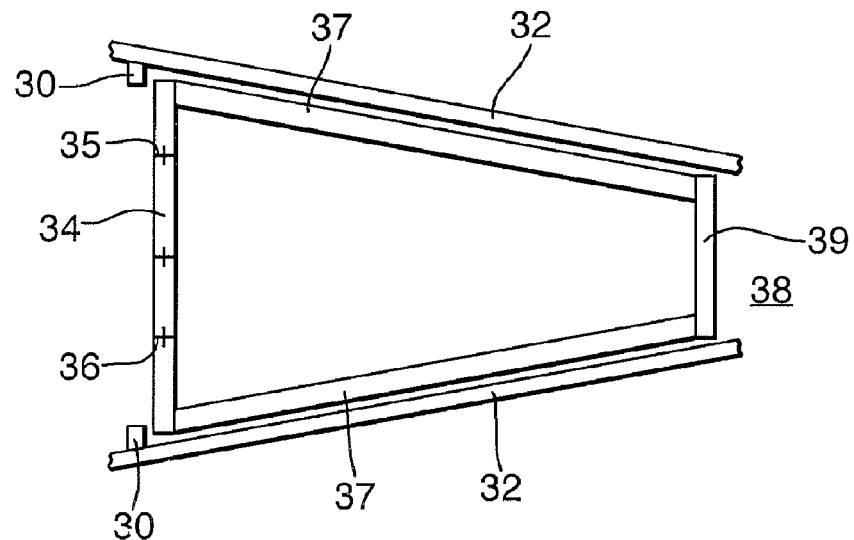
FIG. 3 is a schematic illustration of two particular configurations of a casing assembly in accordance with aspects of the present invention.
Figure 3B:
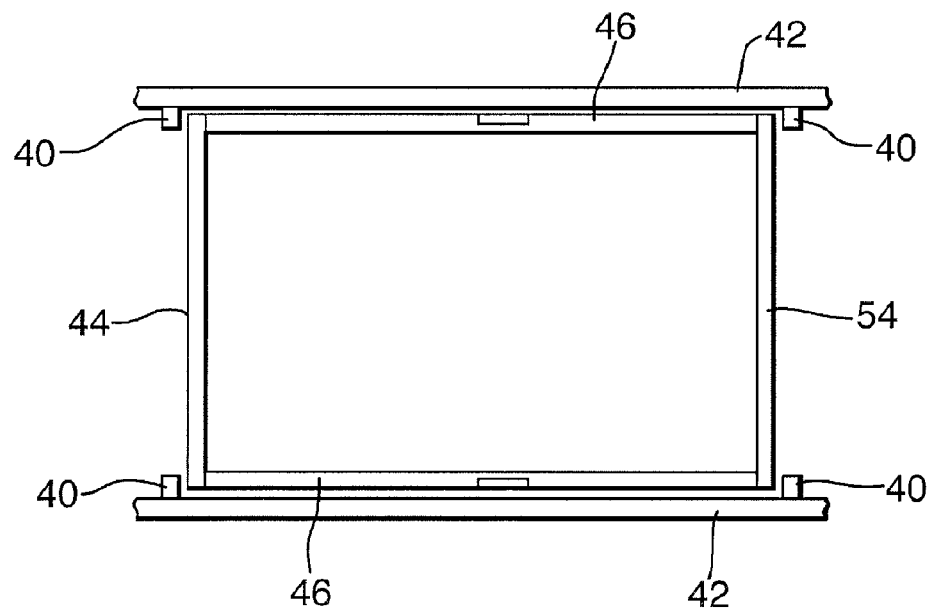

FIG. 3 schematically illustrates a conical tapering configuration in FIG. 3a and a parallel cylindrical configuration in FIG. 3b with regard to casing assemblies in accordance with aspects of the present invention.

As indicated above, FIG. 3a illustrates a conical or tapered casing configuration in accordance with aspects of the present invention. As previously a casing 32 is associated with a ring 34 of a segmented nature with joint straps 35 provided between inter sections 36 of the ring 34. In use, panels 37 are arranged adjacent to the casing 32 and as indicated extend across segmented sections 36 for improved structural strength. The ring 34 as indicated incorporates retainers (not shown), which appropriately present the panels 37 relative to the casing 32. As can be seen the casing 32 narrows and tapers towards an end 38 and in accordance with aspects of the present invention a further loose or closely fitting ring 39 may be provided to ensure that both ends of the panel 37 are appropriately robustly retained and maintained relative to the casing 32. A dam 30 is provided in order to prevent axial movement of the panels 37 along with rings 34, 35. The dam 30 is engaged by a respective ring or parts of the retainer in order to maintain position within the casing 32. It will be appreciated that in view of the tapering nature of the casing 32 that typically only a dam 30 at the front end of the casing 32 is required to prevent axial movement as the assembly will be squeezed into the tapering end and therefore cannot move significantly. However, where required a dam can be provided at both ends.

Although it is advantageous to provide a downstream ring 39 and its appropriate retainers to secure the end of the panels 37 to prevent flapping etc., it will also be understood if the panels 37 are appropriately stiff such that such flapping is substantially eliminated then the ring 39 along with retainers may not be required. In such circumstances, a dam may be provided to act directly on a ring 39 or directly upon the panels 37 as required and if necessary.

FIG. 3b illustrates a parallel cylindrical configuration of a casing assembly in accordance with aspects of the present invention. In such circumstances the casing 42 incorporates rings 44, 54, which are associated with retainers (not shown) for presentation of panels 46. In such circumstances, the general configuration depicted in FIG. 3b is similar to that described previously in that the panels 46 through the retainers and anchoring to the loosely fitting rings 44 are located within the casing 42 as required. However, in view of the cylindrical and parallel nature of the casing 42, it will be appreciated there is a significant possibility of lateral axial slide movement of the assembly within the casing 42. In such circumstances in order to prevent such movement dams 40 are provided at each end of the assembly to prevent such lateral movement for engagement with the respective rings 44, 54.

As indicated above, aspects of the present invention are provided in order to avoid structurally weakening apertures in the casing 42 being necessary in order to support and present panels as required. Nevertheless, it will also be appreciated there are parts of the casing within which such apertures may be acceptable and therefore by appropriate choice of positioning of rings and retainers, in accordance with aspects of the present invention, it will be understood that rings at one end of an assembly may be secured through bolts into the casing and therefore movement anchored by those bolts rather than or in addition to use of dams as anchors in accordance with aspects of the present invention.

Figure 4:
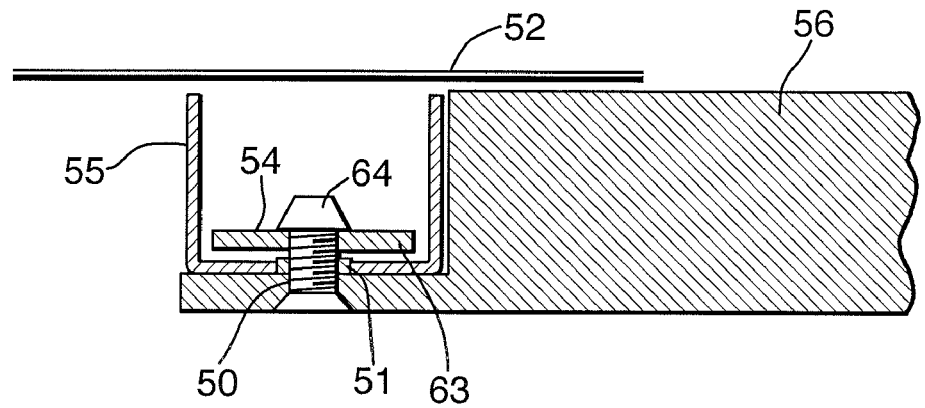
FIG. 4 is a schematic cross section of a second embodiment of a casing assembly in accordance with aspects of the present invention.
Figure 5:
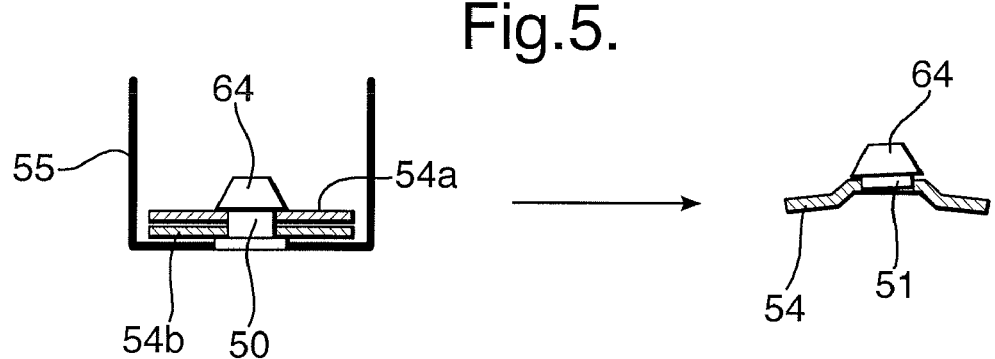
FIG. 5 is a schematic illustration of a first approach to creating an over size condition for retention in accordance with the embodiment of the invention depicted in FIG. 4.
Figure 6:
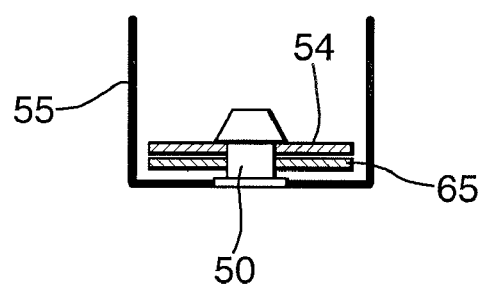
FIG. 6 is a schematic illustration of a second alternative to create an over size condition for retention in accordance with an assembly as depicted in FIG. 4; and, FIG. 7 is a schematic illustration of a third alternative to create an over size condition for retention in accordance with an assembly depicted in FIG. 4.

FIGS. 4 to 6 provide schematic illustrations of a second embodiment of a casing assembly in accordance with aspects of the present invention. Thus, as depicted in FIG. 4, panels 56 are located about a casing 52 and retained in position by a U section ring 55 which in turn is secured by bolts 50 and a clamp ring 54. The ring 55, as indicated, is generally U shaped in section in order to allow the panels 56 to be bolted relative to it. The ring 55 has clearance holes 51 through which the bolts 50 extend. The bolts secure the panels by passing through a section of the panel 56 and engaging with the ring 55 through the clamp ring 54. The bolts 50 are retained by a retaining nut 64. The clamp ring 54 is also segmented and, as illustrated, sits within the U section of the ring 55.

The ring 55 and the clamp ring 54 as indicated are formed from segments and typically there are an equal number of segments but arranged on assembly with staggered joints. The clamp ring 54 is generally slightly over sized with a gap 63 between the clamp ring 54 and the U section ring 55. As the bolts 50 are tightened ends of the clamp ring 54 segments touch such that, as will be described later with regard to two possible options illustrated in FIGS. 5 and 6, the U section ring 55 is clamped against the clamp ring 54 and as the clamp ring 54 circumference becomes too large it locally distorts and forces the U section ring 55 into retaining engagement with the casing 52. It will be appreciated if in an alternative the panels are located outside of the casing 52 then the parts when assembled will be arranged such that the assembled U shape ring will be slightly larger than the casing due to the U sections being clamped to a clamp ring of an over sized circumference.

FIG. 5 illustrates a first alternative with regard to creating an over size condition in the clamp ring 54 depicted in FIG. 4. As can be seen, clamp ring segments 54a, 54b are locally deformed whereby when the bolt 50 is fitted and tightened flattening of the segments 54a, 54b increases the circumference of the clamp ring 54. Thus, as indicated above, such distortion will cause local deformation of the U shaped ring 55 and so engagement with the casing 52.

FIG. 6 illustrates a second alternative approach to creating an over size condition with regard to a clamp ring 54 as depicted in FIG. 4. The clamp ring 54 is presented upon a rubber strip 65. In such circumstances when the bolt 50 is tightened there will be a resultant distortion in the over size clamp ring 54 being pulled inward and forcing the U shape section 55 locally against the casing 52 (FIG. 4).

Figure 7:
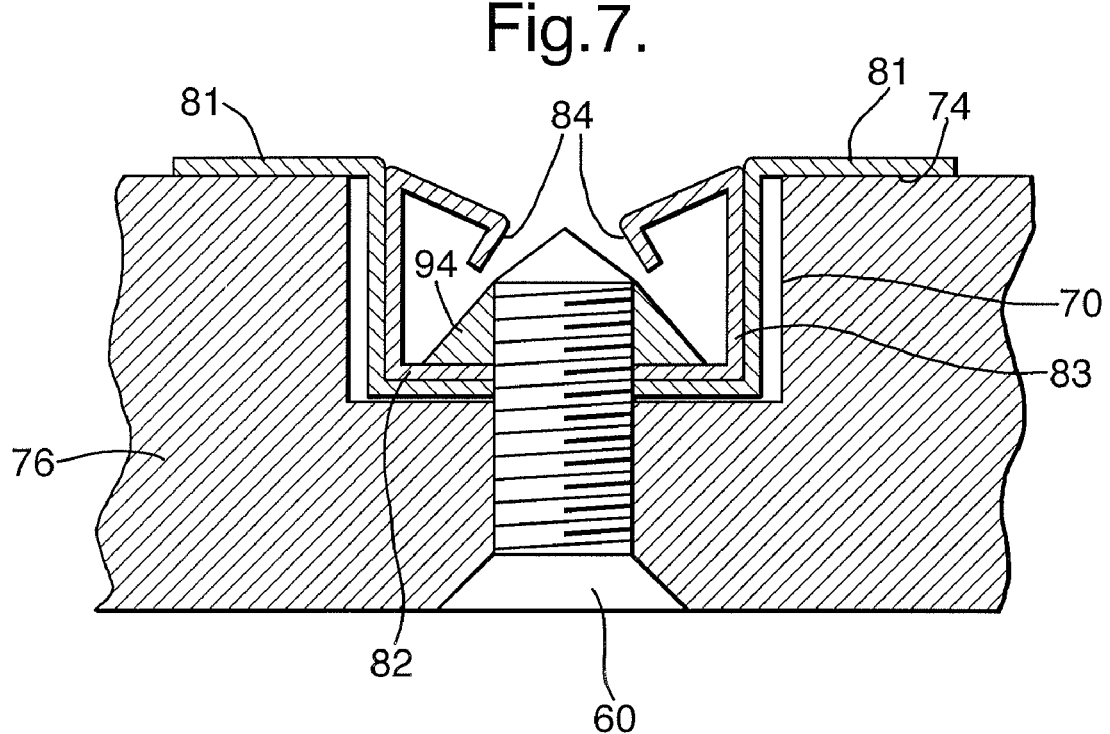

FIG. 7 illustrates a third alternative approach to creating an over size condition with regard to a clamp ring similar to that depicted in FIG. 4. Thus, a ring 74 is arranged to be presented within a recess 70 formed in a panel 76. The ring 74 is secured through a bolt 60 and a retaining or captive nut 94. As can be seen, faces 81 of the ring 74 may overlap shoulder portions of the recess 70 such that the interface between the faces 81 and the shoulder portions may be secured together through an adhesive bond if required.

In order to provide expansion to fit, as indicated previously, the ring 74 includes clearance holes for the bolt 60. Within the ring 74 adjustment clips 82 are provided (only one is shown), which are engaged by a respective captive nut 94.

As indicated, the clips 82 fit inside mounting positions of the ring 74 such that by tightening the bolts against the nuts 94 the panel 76 is secured. It will be noted that generally there is an expansion effect on the mounting ring caused by the action of the bolt end through the captive nut 94 against the clip 82.

In order to provide location of the clip 82 upon the ring 74 typically tabs 83 will be provided. These tabs 83 will locate the clips 82 relative to the mounting ring and therefore facilitate association during expansion in accordance with aspects of the present invention.

The captive nut 94 will be located within the clip 82 such that when the bolt 60 is presented the bolt will screw through the nut 94 and cause engagement against expander portions 84 of the clip 82. Such action will cause expansion of the clip 82 and therefore action against the ring 74 within the recesses 70. Thus, as indicated, the panel 76 will be located and secured.

Panels in accordance with aspects of the present invention will generally be structurally rigid in order to retain their configuration. Thus, the retainers and rings in accordance with aspects of the present invention prevent panel movement radially inward and the panels themselves are sufficiently rigid to prevent distortion and bowing causing inward movement. In such circumstances, the rings appropriately present and configure the panels in use and therefore either through use of simple dam elements inwardly projecting from the casings or where allowed bolts at one point in the casing, a whole assembly when assembled is provided which achieves panel presentation within a casing assembly which is more acceptable.

Modifications and alterations to the present invention will be appreciated by those skilled in the art. For example, the materials from which the ring, retainers and panels are made may be chosen dependent upon particular requirements. Furthermore, as indicated the panels may incorporate themselves reinforcing rib structures formed integrally during a moulding process. This moulding process may be an injection moulding process or compression moulding process as required. Furthermore, it may be possible to provide intermediate reinforcing rings 60 (FIG. 3b) which do not incorporate retainers but simply have appropriate means for securing panels to the ring through bolts extending through the ring and the panel as required. In such circumstances, the intermediate rings 60 will reduce the unsupported length of the panels 46 whilst providing a robust annular ring to reinforce the panel as required. It will also be understood that in some circumstances instead of bolts, adhesive bonding between the ring and the retainer or with intermediate rings between the ring and the panel directly may be possible.

What is claimed is:

1. A fan casing assembly for a gas turbine engine, comprising a ring placed within a casing in use and the ring associated with a retainer for a fan case liner panel,
   the retainer configured to appropriately present the panel relative to the casing about which the ring is placed without a direct mechanical fixing between the ring and the casing, and
   the panel retained by the assembly of the ring, the retainer and the panel,
   wherein the retainer is a U section ring and the ring clamps against the U section ring to cause distortion in use to retain the U section ring against the casing.

2. An assembly as claimed in claim 1 wherein the ring has an interference fit within the casing.

3. An assembly as claimed in claim 1 wherein the ring is segmented.

4. An assembly as claimed in claim 1 wherein the retainer is a compression moulding.

5. An assembly as claimed in claim 1 wherein the retainer is integrally formed with the panel.

6. An assembly as claimed in claim 1 wherein the panel has an integral rib reinforcement structure.

7. An assembly as claimed in claim 1 wherein the retainer is secured to the ring by a captive bolt.

8. An assembly as claimed in claim 1 wherein the assembly comprises a plurality of panels associated with the ring in use.

9. An assembly as claimed in claim 1 wherein the ring is adhesively bonded to the casing.

10. A fan casing assembly for a gas turbine engine, comprising a ring placed within a casing in use and the ring associated with a retainer for a fan case liner panel,
    the retainer configured to appropriately present the panel relative to the casing about which the ring is placed without a direct mechanical fixing between the ring and the casing and
    the panel retained by the assembly of the ring, the retainer and the panel,
    wherein the assembly includes an adjustment clip.

11. An assembly as claimed in claim 10 wherein the adjustment clip includes a tab for location relative to the ring.

* * * * *